United States Patent [19]

Tucker

[11] 4,242,844
[45] Jan. 6, 1981

[54] SPARK PLUG CLEANER WITH IMPROVED GRIT RECYCLING

[75] Inventor: James I. Tucker, Manhattan Beach, Calif.

[73] Assignee: Orion Industries, Inc., Compton, Calif.

[21] Appl. No.: 19,166

[22] Filed: Mar. 9, 1979

[51] Int. Cl.³ .............................................. B24C 3/34
[52] U.S. Cl. ........................................ 51/412; 51/424; 51/432
[58] Field of Search .................. 51/412, 424, 425, 432; 241/275

[56] References Cited

U.S. PATENT DOCUMENTS

| | | | |
|---|---|---|---|
| 1,690,629 | 11/1928 | Fleming | 51/412 |
| 2,550,168 | 4/1951 | Smid | 241/275 X |
| 3,100,724 | 8/1963 | Rocheville | 51/425 X |
| 3,567,141 | 3/1971 | Zbraniborski | 241/275 X |
| 4,028,851 | 6/1977 | Fricke | 51/412 |
| 4,062,155 | 12/1977 | Fricke | 51/412 |
| 4,165,586 | 8/1979 | Fricke | 51/412 |

*Primary Examiner*—Gary L. Smith
*Attorney, Agent, or Firm*—Fulwider, Patton, Rieber, Lee & Utecht

[57] ABSTRACT

A spark plug cleaner is constructed as an upright canister with outwardly directed openings into which spark plugs are inserted. A vertically mounted motor driven impeller sucks grit from an axial center of the canister and flings it toward the spark plug sockets. A grit recovery floor is provided below the impeller and sockets and is configured concave upward. A suction guide fits coaxially over the collection floor and also slopes concave upward toward the center of the impeller. An annular vacuum channel is formed between the collection floor and the suction guide to concentrate impeller suction on spent grit as it falls to said collection floor and to increase grit velocity and density to the impeller.

5 Claims, 5 Drawing Figures

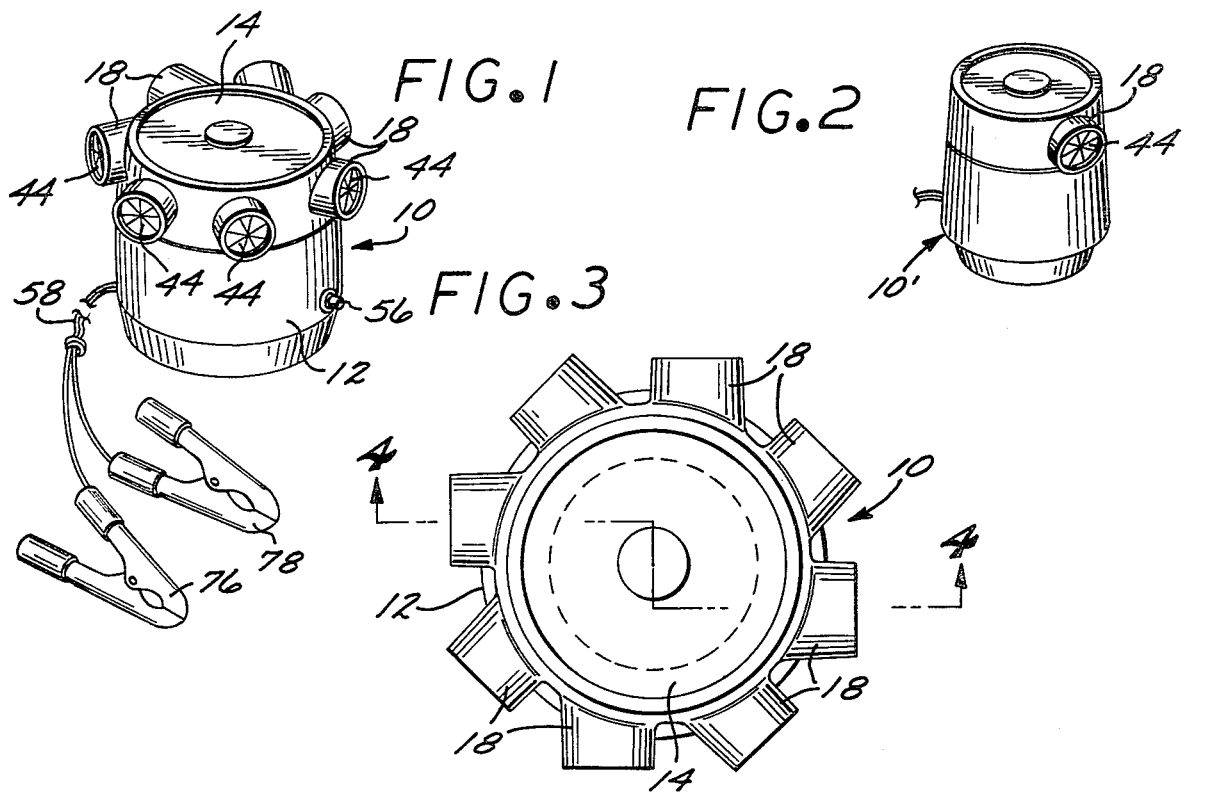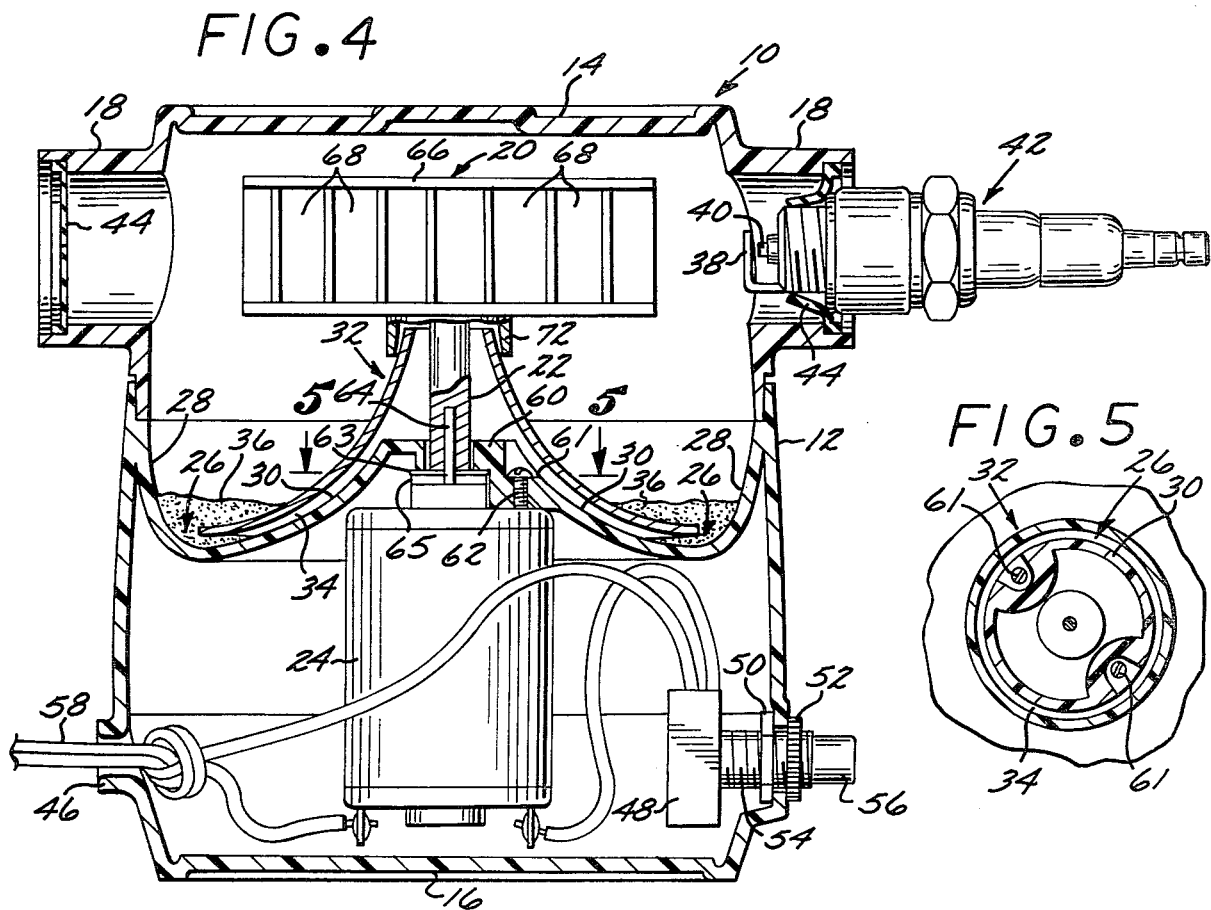

SPARK PLUG CLEANER WITH IMPROVED GRIT RECYCLING

BACKGROUND OF THE INVENTION

1. Field of the Invention

The present invention relates to spark plug cleaners designed for workshop use for amateur internal combustion engine maintenance.

2. Description of the Prior Art

A number of different types of internal combustion engine spark plug cleaners are commercially available for use by amateur mechanics. Some commercially available embodiments are designed for a plurality of spark plugs, while others accomodate but a single plug at a time. Virtually all conventional embodiments of such spark plug cleaners employ an impeller which rotates at a high speed and sucks grit axially toward the impeller near its center and flings the grit outwardly toward a spark plug socket or a plurality of sockets.

The spark plug sockets in conventional plug cleaners may be either horizontally disposed, vertically disposed, or disposed at an angle between the horizontal and vertical. In those spark plug cleaners in which the plug sockets are mounted horizontally, the impeller rotates about a vertically disposed shaft. In such conventional devices, there has been a consistent problem in recycling the grit to the impeller for reuse. Once the grit has inpinged upon the spark plug electrode to effectuate cleaning, its momentum is quickly spent and it falls to the floor of the confining container.

The principal difficulty in conventional systems arises in returning the spent grit to the impeller for reuse. In conventional devices with impellers mounted about vertical axes a suction is created to draw the grit upwardly for this purpose. However, in conventional devices it has been extremely difficult to recycle grit to any significant degree because of the low suction that is normally produced by the motors and impellers utilized. In one commercially available device, a helical or spiral ramp is defined about a vertical axis coaxial with the impeller axis. The spiral about the vertical axis is intended to slope siginficantly to allow the grit to reach the impeller quickly. Nevertheless, the vertical spiral configuration necessarily forces the grit against the outer cylindrical confines of the spiral channel and as a consequence, the grit arrives at the impeller intake at a relatively low velocity. The rotation of the impeller imparts additional velocity to the grit to increase its momentum to impinge upon the spark plug electrodes. However, since the grit has very little momentum entering the impeller, its momentum as it strikes the spark plug electrodes is developed almost entirely within the impeller.

Other spark plug cleaners have sought to enhance suction by providing relatively narrow cylindrical tubes leading from the impeller inlet to the collection floor of the plug cleaning chamber. In this fashion, suction is applied over a smaller cross sectional area, and hence a greater vacuum is produced. However, because suction is applied over a small area there is a tendency for the grit at the collection floor in the immediate vicinity of the suction tube to be quickly depleted, and hence the density of grit passed through the impeller is reduced.

SUMMARY OF THE INVENTION

It is an object of the present invention to improve both the concentration and momentum of grit discharged through an impeller to impinge against the spark plug electrodes to be cleaned in a spark plug cleaner. This is achieved by an improved construction which more rapidly recycles the grit. The spark plug cleaner of the invention employs a canister having one or more horizontally disposed spark plug sockets or ports and an impeller mounted about a vertical axis for directing grit toward these ports. The spark plug cleaner is provided with a concave annular collection floor located within the canister beneath the level of the sockets and the impeller. The collection floor slopes upwardly toward the interior of the confining canister walls, and also upward toward the impeller axis. A generally cone shaped convex suction guide fits coaxially over the collection floor where it slopes upward toward the impeller. The narrow annular space between the suction guide and collection floor forms a narrow annular vacuum channel leading from the collection floor to the impeller to supply the impeller with grit to fling centrifically outward against the electrodes of spark plugs positioned in the sockets. Thereafter, the spent grit sinks again to the collection floor. Because the floor slopes upward toward the canister walls, the spent grit slides downwardly and inwardly toward the mouth of the annular vacuum channel between the collection floor and the suction guide. This maximizes the concentration of grit at the suction inlet.

The invention may be constructed to accommodate either one or a plurality of spark plug sockets mounted in horizontal disposition. The impeller is formed with a plurality of radial or inclined vanes with openings therebetween through which grit is expelled. The grit travels in generally horizontal tangential paths from approximately the impeller periphery under the influence of the centrifugal force applied thereto by the impeller. The spark plug sockets are preferably aligned with the tangential paths of travel of the grit so as to maximize the direct impact of the grit on the spark plug electrodes to be cleaned. It is advantageous to provide the impeller with a cylindrical shield with a single outwardly directed opening therein through which grit can pass. The purpose of the shield is to maximize air flow with grit thru the suction channel leading to it and to minimize air flow from the larger portion of the chamber immediately under the impeller.

The invention may be described with greater clarity and particularity by reference to the accompanying drawings.

DESCRIPTION OF THE DRAWINGS

FIG. 1 is a perspective view of one embodiment of the invention employing a plurality of spark plug sockets.

FIG. 2 is a perspective view of an alternative embodiment of the invention employing but a single socket.

FIG. 3 is a top view of the embodiment of FIG. 1.

FIG. 4 is a sectional elevational view taken along the lines 4—4 of FIG. 3.

FIG. 5 is a sectional view taken along the lines 5—5 of FIG. 4.

DESCRIPTION OF THE EMBODIMENTS

FIG. 4 depicts a spark plug cleaner formed as a generally cylindrical canister 10 having an upright cylindrical wall 12 closed at its ends by a generally disk-shaped top 14 and a generally disk shaped bottom 16. A plurality of tubular spark plug sockets 18 are defined in the upper portion of the wall 12, all disposed in a common horizontal plane just below the top 14. Within the canister 10 a disk-shaped impeller 20 is mounted horizontally in the same plane as the sockets 18. The impeller 20 is mounted for rotation about a vertical axle 22, located at the center of the device. The impeller 20 is driven in rotation by a small electric motor 24, located in the lower portion of the canister 10. Within the canister 10 there is a concave upward annular collection floor depicted at 26. The collection floor 26 slopes upwardly and outwardly, in a surface 28 toward the upright wall 12, and upwardly and inwardly toward the impeller in an opposing surface 30 as depicted in FIG. 4.

A generally truncated, cone shaped suction guide 32 fits coaxially over the collection floor 26 directly above the upwardly and inwardly sloping surface 30. The sloping surface 30 of the collection floor 26 and the suction guide 32 define therebetween an annular vacuum channel denoted at 34. The channel 34 leads from the collection floor 26 to the impeller 20 to supply the impeller 20 with grit 36. The grit 36 is comprised of small particles of sand or other abrasive which are sucked through the vacuum channel 34 and into the impeller 20 and are flung against the electrodes 38 and 40 of spark plugs located in the sockets 18, such as the spark plug 42 depicted in FIG. 4.

The canister 10 is formed of plastic. The upper section of the canister 10 is a generally cup-shaped structure disposed in inverted fashion and from the outer wall of which sockets 18 protrude. The sockets 18 are tubular structures integrally formed with the canister 10. At the mouths of the sockets 18 there are rubber disk shaped inserts 44 inset and glued into shoulders defined at the mouths of the sockets 18. The rubber gaskets 44 have a generally star-shaped configuration of cuts therein, as depicted in FIGS. 1 and 2. The star-shaped cuts divide the gaskets 44 into a plurality of sector shaped flaps. These flaps may be forced aside by a spark plug 42 which is manually pushed into a socket 18. When the gasket flaps are forced aside by a spark plug, they leave the electrodes 38 and 40 of a spark plug 42 in the path of grit flung centrifugally from the impeller 20.

The lower portion of the canister 10 is also of a generally cup-shaped configuration. Near the bottom of the lower section there is a molded annular power cord port defined by a collar 46 and a circular aperture within which an electrical switch 48 is restrained. The electrical switch 48 is locked in position by threaded bushings 50 and 52, on the inside and outside respectively of the wall 12. The bushings 50 and 52 engage an annular threaded sleeve 54 within which a spring biased push button 56 resides.

The upper extremity of the lower section of the canister 10 is bounded by the collection floor 26, which is a molded plastic structure facing concave upward and convex downward, as depicted in FIG. 4. At the inner extremity of the sloping surface 30 of the collection floor 26 there is a thickened section 60 with a mounting tab 61. A mounting screw 62 extends through the mounting tab 61 and into a tapped hole in the upper end of the motor 24 to mount the motor in the canister 10. A fiber or felt washer 63 serves as a protective device for the motor 24 under the thickened section 60 and above a motor bearing 65. One of the electrical leads of the connector cord 58 is connected to one power input contact of the motor 24, while the other is connected to the other power contact through the switch 48. The circuit is completed to drive the motor 24 during the time that the pushbutton 56 is in the depressed condition. The electrical switch 48 closed by the pushbutton 56 remains on until depressed again to turn the spark plug cleaner off. This allows the operator to use both hands to rotate the plug 42 within the sockets 18 for more thorough cleaning.

Mounted atop the motor shaft 64 is an enlarged axle 22 of sufficient diameter to power the impeller 20. The upper end 66 of the impeller 20 is a circular disk, while the lower end 68 is an annular disk. The impeller 20 includes a number of vanes 68 which are directed outwardly from the axle 22 and are integrally formed therewith. The vanes 68 are either radial or they may be curved. With either construction, the vanes 68 define openings therebetween through which grit is expelled centrifugally through tangential paths toward the cylindrical wall 12 of the canister 10. As is apparent from FIG. 3, the spark plug sockets 18 are offset from radial alignment with the canister 10, and are instead aligned with a tangential path of travel of the grit 36 from the impeller 20.

At the underside of the annular bottom 68 of the impeller 20 there is an axially extending annular collar 72 that extends downward outside of the suction guide 32. The collar 72 forms a shield at the upper extremity of the vacuum channel 34 to maximize air flow with grit through the vacuum channel 34 and to minimize air flow from the larger area of the chamber outside the suction guide 32.

The upper and lower sections of the canister 10 fit snugly together as depicted in FIG. 2, to create a relatively smooth surface at the interior upright wall 12, so that spent grit is not caught between the upper and lower sections, but rather flows smoothly down the interior surface of the wall 12 to the curved surface 28 of the collection floor 26.

In the operation of the invention, spent grit tends to collect in the lowest area of the collection floor 26 between the oppositely sloping surfaces 28 and 30. Since the lower extremity of the suction guide 32 terminates directly above this area, a narrow annular vacuum channel 34 is formed at the mouth of the suction guide 32 and between the suction guide 32 and the collection floor 26. Since the vacuum produced as a result of rotation of the impeller 20 by the motor 24 is concentrated in this small area, the particles of grit are swept swiftly upward through the vacuum channel 34 toward the axle 22 and toward the impeller 20. Because of the tendency of the grit to collect at the mouth of the suction channel 34, a high density of grit is continuously supplied to the impeller 20. Because of the narrow dimensions of the vacuum channel 34, and because of the smooth arcuate curves of the suction guide 32 and the sloping surface 30, the grit 36 arrives at the impeller 20 with a great deal of momentum. Further momentum is imparted to the grit 36 by the impeller 20 with the result that the grit 36 achieves a greater velocity in impingment upon the electrodes 38 and 40 of the spark plug 42.

With the enhanced grit concentration and the increase in grit velocity, the present invention is able to more effectively clean spark plug electrodes in a significantly shorter time, as contrasted with prior art devices. This is true both with respect to the embodiment designed to clean a single spark plug, depicted at 10' in FIG. 2, and also in the multiple spark plug cleaner 10 depicted in FIG. 1.

Both embodiments of the spark plug cleaner of the invention may be driven from an automotive vehicle battery. Power is transmitted through the power cord 58 from color coded clamps 76 and 78, depicted in FIG. 1. Accordingly, the spark plug cleaner of the invention can be utilized outside, and is not dependent upon the availability of commercial a.c. power.

It should be understood that numerous variations and modifications of the invention are possible. The spark plug cleaner can be used not only to clean the spark plugs of automotive vehicles, but also spark plugs employed in connection with other devices, such as boat motors, snowblowers and lawn mowers. Moreover, various alternative motor mounting arrangements, canister constructions and spark plug socket configurations are possible. Accordingly, the scope of the invention should not be limited to the specific embodiments depicted in the drawings, but rather is defined in the claims appended hereto.

I claim:

1. A spark plug cleaner comprising:
    a housing having a confining wall and a vertical axis and at least one spark plug socket extending into said confining wall in the upper portion thereof for receiving and holding a spark plug with electrodes directed inwardly relative to said axis;
    an impeller mounted on a shaft within said housing to rotate about said vertical axis at the level of said socket, said impeller comprising a horizontally disposed circular upper disk and a parallel annular lower disk spaced therefrom by a plurality of vanes with outwardly directed openings therebetween, said lower annular disk having a downwardly extending collar outside of a central circular opening therein,
    an annular concave collection floor located below said socket and converging upwardly and inwardly in a smooth, arcuate, curved sloping surface toward said axis and upwardly and outwardly toward said confining wall,
    an annular suction guide located interiorally of said confining walls and having a smooth, arcuate, curved sloping surface facing convex inward toward said axis and toward said collection floor in spaced disposition therefrom and coaxial therewith to define an annular suction gap therebetween, whereby said collar of said lower disk overlaps said suction guide and resides in close proximity thereto, and
    an electric motor for driving said shaft and said impeller to propel grit therein outwardly toward said spark plug socket whereby spent grit falls to said collection floor for recycling to said suction gap for reuse.

2. A spark plug cleaner according to claim 1 further characterized in that said electric motor is located below said collection floor and is connected to said impeller by a vertical shaft along said vertical axis.

3. A spark plug cleaning device comprising a canister having upright walls in which a plurality of spark plug sockets are defined at a common horizontal level, impeller means located inwardly of said spark plug sockets for rotation about a vertical axis, said impeller means being mounted on a shaft and having a horizontally disposed circular upper disk and a parallel annular lower disk spaced therefrom by a plurality of vanes with openings therebetween and an annular collar that extends downward from said lower disk about a circular opening therein, a motor for driving said shaft and said impeller, a concave collection floor located within said canister beneath the level of said sockets and sloping upward toward said upright walls and upward in a smooth, arcuate, curved sloping surface toward said impeller, and a suction guide facing convex toward said collection floor in spaced disposition therefrom and coaxial therewith and interiorally of said upright walls and said suction guide and said collection floor together define therebetween an annular vacuum channel leading from said collection floor to said impeller to supply said impeller with grit to fling centrifugally outward against spark plugs in said sockets, and to thereafter sink to said collection floor and said collar of said lower disk overlaps said suction guide and resides in close proximity thereto.

4. A spark plug cleaner according to claim 3 further characterized in that said impeller is constructed with outwardly directed vanes with openings therebetween through which grit is expelled in tangential paths, and said sockets are each aligned with one of said tangential paths.

5. A spark plug cleaner according to claim 3 further characterized in that said sockets are each equipped with flexible, penetrable coverings to allow the insertion of spark plug electrodes therein, and to otherwise block said grit from escaping said canister.

* * * * *

Disclaimer 4,242,844.—*James I. Tucker*, Manhattan Beach, Calif. SPARK PLUG CLEANER WITH IMPROVED GRIT RECYCLING. Patent dated Jan. 6, 1981. Disclaimer filed Mar. 29, 1989, by the assignee, Mr. Gasket Co.

Hereby enters this disclaimer to the entire term of said patent.
*[Official Gazette May 23, 1989]*